United States Patent [19]

Dunand

[11] Patent Number: 4,993,785
[45] Date of Patent: Feb. 19, 1991

[54] WRITING SUPPORT

[75] Inventor: Georges Dunand, La Balme de Sillingy, France

[73] Assignee: Boitabloc, societe anonyme, Pringy, France

[21] Appl. No.: 467,265

[22] Filed: Jan. 19, 1990

[30] Foreign Application Priority Data

Jan. 26, 1989 [FR] France ................... 89 01314

[51] Int. Cl.$^5$ ............................................ A47B 67/02
[52] U.S. Cl. .................... 312/245; 248/223.4
[58] Field of Search ............... 211/87, 88; 312/245; 248/224.2, 225.1, 223.4

[56] References Cited

U.S. PATENT DOCUMENTS

| | | | |
|---|---|---|---|
| 194,971 | 9/1877 | Morgan | 312/245 |
| 1,599,653 | 9/1926 | Cranston | 248/223.4 X |
| 2,189,607 | 2/1940 | Krischke | . |
| 2,727,272 | 12/1955 | Hankin et al. | 248/223.4 X |
| 4,100,684 | 7/1978 | Berger | 211/88 |

FOREIGN PATENT DOCUMENTS 1001158 6/1957 Fed. Rep. of Germany .
8507305 9/1966 Fed. Rep. of Germany .

Primary Examiner—Joseph Falk
Attorney, Agent, or Firm—Ratner & Prestia

[57] ABSTRACT

A writing support is disclosed comprising a strip which can be fixed on a fixed wall and receive an intermediate shaped adjusting piece. A writing supprot box is fitted by a longitudinal rib in one of the grooves on the external face of the intermediate shaped adjusting piece and receives a block of repositionable removable sheets and a writing means. The writing support box may be readily fitted or removed by longitudinal sliding and its slant may be adjusted.

5 Claims, 2 Drawing Sheets

WRITING SUPPORT

BACKGROUND OF THE INVENTION

1. Field of the Invention

The present invention relates to a writing support for receiving sheets on which the user may write messages, and which is intended to be removably fixed to a wall.

The writing support of the invention is particularly suitable for use in motor vehicles

2. Description of the Prior Art

A removable table for motor vehicles is already known, described in U.S. Pat. No. 2,189,607. This table comprises a fixed plate which is fitted to a motor vehicle door or the wall of the vehicle dashboard, with a longitudinal slit in which is engaged a T bracket with holes. Two hooks are engaged in the holes and hold a plate forming the table. The plate is hinged to the hooks and a screw adjusts its slant. In such a structure, the connection between the adjustable plate and the fixed plate is provided by a succession of parts which have resilient deformation and considerable free motion. The assembly is not sufficiently rigid for writing on the sheets laid on the plate. Such rigidity, necessary for writing, is not required for a table or shelf intended to support inert objects.

A first problem which the invention seeks to solve is to provide a writing structure which can be very readily fitted to and removed from the wall of the vehicle, while being sufficiently rigid to allow writing. Thus, the user may rapidly fix the writing support on the wall of the vehicle and remove it from said wall without using tools and by very simple movements; despite such simplicity and such speed of fitting and removing, the writing support of the invention is held very rigidly in a fixed position on the wall of the vehicle and provides a rigid support for writing.

A second problem which the invention attempts to solve is to permit adjustable orientation of the writing support with respect to the wall of the vehicle without adversely affecting the rigidity which makes writing possible. It has been discovered that such orientation is made necessary for fitting the writing support to all existing vehicles In fact, dashboards have very various shapes and generally comprise no portion for fixing a flat element of sufficient dimensions to form a support for writing sheets. It is then necessary to provide intermediate means connecting the flat sheet supporting element to the wall of the vehicle and means for orienting this element with respect to the wall, particularly for housing the flat element with respect to the non flat surface of the dashboard.

Another problem which the invention attempts to solve is to provide fixing means which, when the writing support is removed, leave on the wall of the vehicle elements of discreet appearance which do not adversely affect the aesthetics of the vehicle.

In another aspect of the invention, the writing support is adapted for receiving blocks of repositionable removable sheets and a writing means such as a pencil or pen. It may also comprise visible surfaces having decorations or inscriptions, for example advertizing slogans.

SUMMARY OF THE INVENTION

To attain these objects as well as others, the writing support of the invention comprises a writing receptacle element, a profiled fixing strip and an intermediate shaped adjusting piece.

The means for connection between the profiled fixing strip and the writing receptacle element permit longitudinal sliding of the elements with respect to each other and in particular longitudinal sliding of the writing receptacle element with respect to the intermediate shaped adjusting piece, so that fitting and removal of the writing receptacle element may be made by simple longitudinal sliding, the assembly means however permitting very rigid fixing of the writing receptacle element on the wall of the vehicle. For that, the support comprises:

- a profiled fixing strip, having a flat base for applying and fixing same by securing means to said wall, and comprising a longitudinal rib with dovetail cross-section for receiving and retaining an intermediate shaped adjusting piece,
- a writing receptacle element having a base wall with a longitudinal rib with dovetail cross-section for fixing to an intermediate shaped adjusting piece,
- an intermediate shaped adjusting piece having, on a first face, at least a first longitudinal first face groove with a dovetail cross-section complementary to the longitudinal rib of the profiled fixing strip for fixing same to the profiled fixing strip and comprising, on a second face, at least one longitudinal groove with a dovetail cross-section complementary to the rib of the writing receptacle element for receiving and retaining the writing receptacle element.

For providing relative orientation of the writing receptacle element and of the wall of the vehicle, according to one embodiment, the intermediate shaped adjusting piece comprises at least two longitudinal second face grooves offset angularly so as to permit the intermediate shaped adjusting piece to be fixed with respect to the profiled fixing strip and to the writing receptacle element in at least two separate orientations defining two relative slants of the writing receptacle element with respect to the flat fixing strip base.

Preferably, the longitudinal first and second face grooves of the intermediate shaped adjusting piece have the same cross-section and the ribs of the profiled fixing strip and of the writing receptacle element have the same cross-section. Thus, the intermediate shaped adjusting piece is reversible, which increases the possibilities of relative orientation between the writing receptacle element and the wall of the vehicle.

BRIEF DESCRIPTION OF THE DRAWINGS

Other objects, characteristics and advantages of the present invention will be clear from the following description of particular embodiments, with reference to the accompanying figures in which.

DESCRIPTION OF THE PREFERRED EMBODIMENTS

Figure 1:
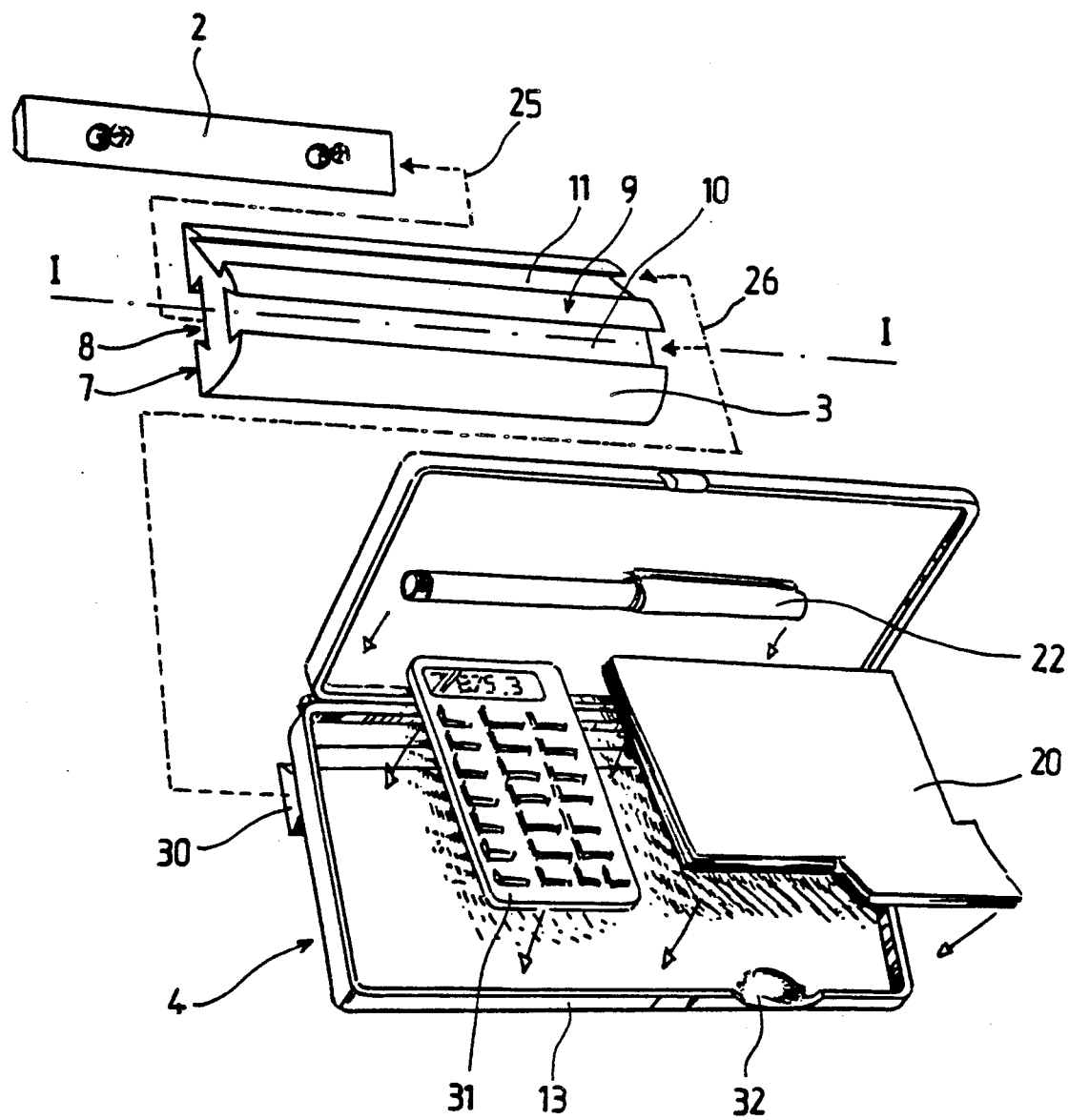
FIG. 1 is an exploded perspective view of a writing support in accordance with the invention.

As shown in the figures, the writing support of the invention, intended to be removably fixed to a wall 1, for example a wall of a vehicle, comprises a profiled fixing strip 2, an intermediate shaped adjusting piece 3 and a writing receptacle element 4.

The profiled fixing strip 2 has a flat base 5 for application to wall 1 and it is fixed by means such as screws 6 or adhesive to said wall 1. Strip 2, in the embodiment shown, has a trapezoidal cross-section whose small base forms the base 5 of the strip, thus forming by itself a rib with dovetail cross-section.

The intermediate shaped adjusting piece 3, in the embodiment shown in the figures, comprises a first substantially flat face 7 having a longitudinal groove 8 and a second cylindrical face 9 with a longitudinal axis having a first longitudinal groove 10 and a second longitudinal groove 11. The grooves 10 and 11 are offset angularly with respect to each other by rotation about a longitudinal axis I—I of the intermediate shaped adjusting piece 3. The longitudinal groove 8 has a dovetail cross-section complementary to the cross-section of the profiled fixing strip 2. Preferably, the first longitudinal groove 10 and the second longitudinal groove 11 of the second face 9 also have dovetail cross-sections identical to the cross-section of groove 8, so that the intermediate shaped adjusting piece 3 may possibly be fitted to strip 2 either by its groove 8 or by one of its grooves 10 and 11.

In the embodiment shown, the first groove 10 is substantially parallel to groove 8, i.e. it defines an assembly plane 29 parallel to the assembly plane of the groove 8 or plane of the flat base 5 of strip 2. On the other hand, the second groove 11 is slanted so as to define an assembly plane 27 slanted, for example through 30°, with respect to the assembly plane of groove 8.

In the embodiment shown, the writing receptacle 4 is a box having a base wall 12, whose outer face has a longitudinal rib 30 projecting therefrom. The base wall 12 is substantially rectangular and is edged by peripheral flanges such as flanges 13 and 23 opposite the outer face comprising rib 30. The base wall 12 receives a lid 14 hinged along a longitudinal edge 15 of said base wall 12. The longitudinal rib 30 is disposed in the vicinity of the longitudinal edge 15.

To provide good rigidity of the support, for writing, it is advantageous to provide groove-rib fitting over the greatest possible length. For that, a strip 2 and an intermediate shaped adjusting piece 3 are advantageously provided whose respective lengths are substantially equal to the width of the base wall 12, grooves 8, 10, 11 and ribs 2 and 30 being also of the same length substantially equal to the width of the base wall 12.

Lid 14 comprises two parallel walls, namely an inner wall 16 and an outer wall 17, between which an intermediate sheet 18 may be inserted. The intermediate sheet 18 may carry a decoration or legends visible through one at least of the inner 16 or outer 17 walls of the lid, said lid wall being then transparent.

The base wall 12 of the receptacle element 4 receives, on its inner face 19, a block 20 of repositionable removable sheets on which the user may write messages. A zone 21 is reserved, on the inner face 19 of the base wall 12, for receiving a writing means 22 such as a pencil or a pen. Zone 21 is limited by the longitudinal flange 23 and by a resilient longitudinal rib 24 providing snap-fitting of the writing means 22.

The operation of the device is as follows: the strip 2 is fixed by screwing or adhesive by its base 5 to a wall 1, in the chosen position. Then the intermediate shaped adjusting piece 3 is fitted on strip 2, by causing said intermediate shaped adjusting piece 3 to slide longitudinally for engaging one of its ribs on strip 2. For example, groove 8 is engaged on strip 2, as shown by the arrow 25 in FIG. 1. Then the receptacle element 4 is fitted on the intermediate shaped adjusting piece 3, by causing said receptacle element 4 to slide longitudinally with respect to the intermediate shaped piece and engaging rib 30 in one of the grooves of the intermediate shaped adjusting piece 3, as shown by arrows 26 in FIG. 1. For example, as shown in FIG. 2, rib 30 is engaged in the first groove 10 of the intermediate shaped piece 3. This position gives a first orientation of the receptacle element 4 with respect to wall 1, which orientation is shown by the chain-dotted line 29.

If rib 30 is engaged in the second groove 11, a second orientation of the receptacle element 4 is obtained, shown schematically by the chain-dotted line 27.

It will be readily understood that, by fitting the intermediate shaped adjusting piece 3 on strip 2 by its groove 8 in a position which is symmetrical with respect to the longitudinal plane of symmetry of said strip, and by inserting rib 30 in the second groove 11, a third slant of the receptacle element 4 is obtained such as shown by the chain-dotted line 28.

By fitting the intermediate shaped piece 3 on strip 2 by its groove 11, two other possible fixing positions are obtained, depending on the two possible symmetrical positions of the intermediate shaped adjusting piece 3.

It will be readily understood that positioning and removal of receptacle element 4 is very easy, by simple longitudinal sliding on the intermediate shaped piece 3. If it is desired to make the device particularly discreet when the receptacle element 4 is removed, the intermediate shaped piece 3 may also be removed and only the strip 2 remains on wall 1.

Figure 2:
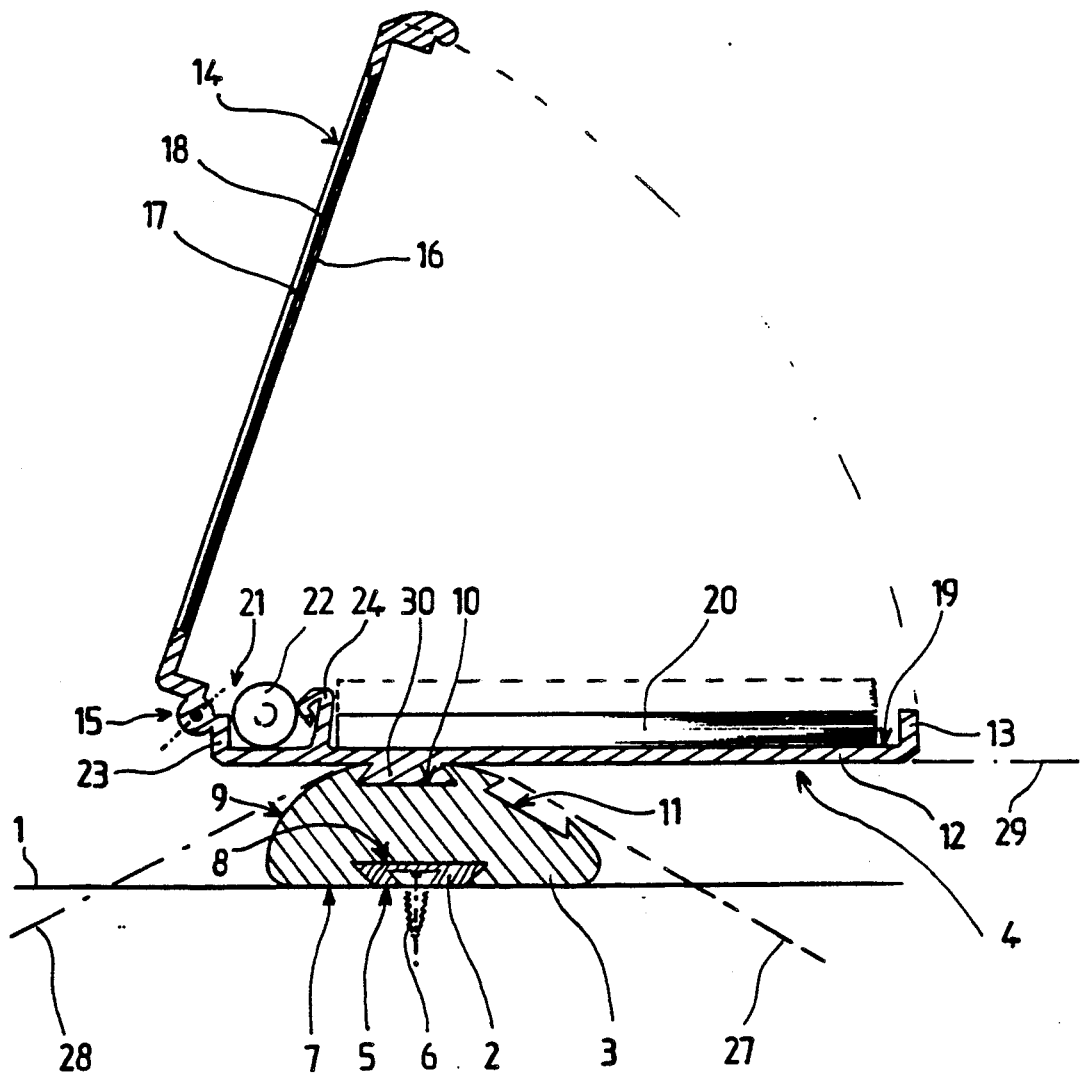
FIG. 2 is a side sectional view of a writing support in accordance with the invention.

As shown in FIG. 1, a receptacle element 4 may be provided receiving at one and the same time a block 20, a writing means 22 and a computing means 31. For facilitating gripping of the repositionable removable sheets of block 1, a cut-out 32 may be advantageously provided in the front flange 13, for giving lateral access to the side of block 20.

The present invention is not limited to the embodiments which have been explicitly described, but it includes the different variants thereof and generalizations thereof contained within the scope of the following claims.

What is claimed is:

1. A writing support intended to be removably fixed on a wall, comprising:
   a profiled fixing strip, having a flat base for applying and fixing same by securing means to said wall, and comprising a longitudinal rib with dovetail cross-section for receiving and retaining an intermediate shaped adjusting piece;
   a writing receptacle element having a base wall with a longitudinal rib with dovetail cross-section for fixing to an intermediate shaped adjusting piece; and
   an intermediate shaped adjusting piece having, on a first face, at least a first longitudinal first face groove with a dovetail cross-section complementary to the longitudinal rib of the profiled fixing strip for fixing same to the profiled fixing strip and comprising, on a second face, at least two longitudinal grooves, each having a dovetail cross-section complementary to the rib of the writing receptacle element for receiving and retaining the writing receptacle element, which two longitudinal second face grooves are offset angularly so as to permit the intermediate shaped adjusting piece to be fixed with respect to the profiled fixing strip and to the writing receptacle element in at least two separate orientations defining two relative slants of the writing receptacle element with respect to the flat fixing strip base.

2. Writing support as claimed in claim 1, wherein said intermediate shaped adjusting piece comprises:
   a substantially flat first face having the first longitudinal groove,
   a second cylindrical face with longitudinal axis having a first longitudinal second face groove and a second longitudinal second face groove offset angularly with respect to each other by rotation about a longitudinal axis.

3. Writing support as claimed in claim 2, wherein:
   the longitudinal first and second face grooves of the intermediate shaped adjusting piece have the same cross-section,
   the rib of the profiled fixing strip and the rib of the writing receptacle element have the same cross-section so that the intermediate shaped adjusting piece is reversible.

4. Writing support as claimed in claim 2 wherein:
   said first longitudinal second face groove of the intermediate shaped adjusting piece is oriented for defining an assembly plane substantially parallel to the assembly plane of the longitudinal first face groove of the intermediate shaped adjusting piece,
   said second longitudinal second face groove of the intermediate shaped adjusting piece is oriented for defining an assembly plane inclined through 30° with respect to the assembly plane of the longitudinal first face groove of said intermediate shaped adjusting piece.

5. Writing support as claimed in claim 1, wherein the engagement members of the writing receptacle element are disposed in the vicinity of a longitudinal edge of the base wall.

* * * * *